US008007703B2

(12) United States Patent
Jha et al.

(10) Patent No.: US 8,007,703 B2
(45) Date of Patent: Aug. 30, 2011

(54) PROCESS TO PREPARE A SHAPED SOLID DETERGENT

(75) Inventors: Kamal Pramod Jha, Chicago, IL (US); Rahul Ashok Sali, Mumbai (IN)

(73) Assignee: Unilever Home & Personal Care USA Division of Conopco, Inc., Greenwich, CT (US)

( * ) Notice: Subject to any disclaimer, the term of this patent is extended or adjusted under 35 U.S.C. 154(b) by 1051 days.

(21) Appl. No.: 10/994,690

(22) Filed: Nov. 22, 2004

(65) Prior Publication Data

US 2006/0000575 A1 Jan. 5, 2006

(30) Foreign Application Priority Data

Nov. 25, 2003 (IN) ........................................ 1218/03

(51) Int. Cl.
*B29C 47/00* (2006.01)
*B29C 47/88* (2006.01)
*C11D 3/02* (2006.01)

(52) U.S. Cl. .................................................. 264/211.11

(58) Field of Classification Search .............. 264/211.11
See application file for complete search history.

(56) References Cited

U.S. PATENT DOCUMENTS 1,783,864 A * 12/1930 Vogt .................................. 62/69
2,385,322 A 9/1945 Walter
3,089,197 A * 5/1963 Chaffee et al. .................. 264/50
3,832,431 A * 8/1974 Matthaei ......................... 264/75
4,290,904 A * 9/1981 Poper et al. ................... 510/147
4,304,679 A * 12/1981 Hooper et al. ................ 424/402

FOREIGN PATENT DOCUMENTS

| | | |
|---|---|---|
| EP | 0321179 | 6/1989 |
| GB | 394 365 | 6/1933 |
| GB | 561363 | 5/1944 |
| GB | 597322 | 1/1948 |
| WO | 03/025110 | 3/2003 |

OTHER PUBLICATIONS

GB Search Report, GB0403411.2, dated Apr. 26, 2004—1 p.
International Search Report, PCT/EP2004/012958, mailed Feb. 22, 2005—2 pp.

* cited by examiner

*Primary Examiner* — Richard Crispino
*Assistant Examiner* — Patrick Butler
(74) *Attorney, Agent, or Firm* — Alan A. Bornstein

(57) ABSTRACT

A system for continuous casting of melt-cast products such as soaps, detergents and the like comprising: i) a substantially vertically disposable mold unit to favor solidification/casting of the melt cast composition during an upstream motion through the mold unit; ii) the mold unit operatively connected at it's lower end to a supply source of the melt-cast composition; iii) means for controlling the temperature of the melt in the mold unit to achieve the desired solidification and shaping during traverse of the melt from the bottom of the mold towards the top thereof, which is adapted to eject the formed cast product.

11 Claims, 1 Drawing Sheet

Flow sheet of continuous casting setup

Figure 1: Flow sheet of continuous casting setup
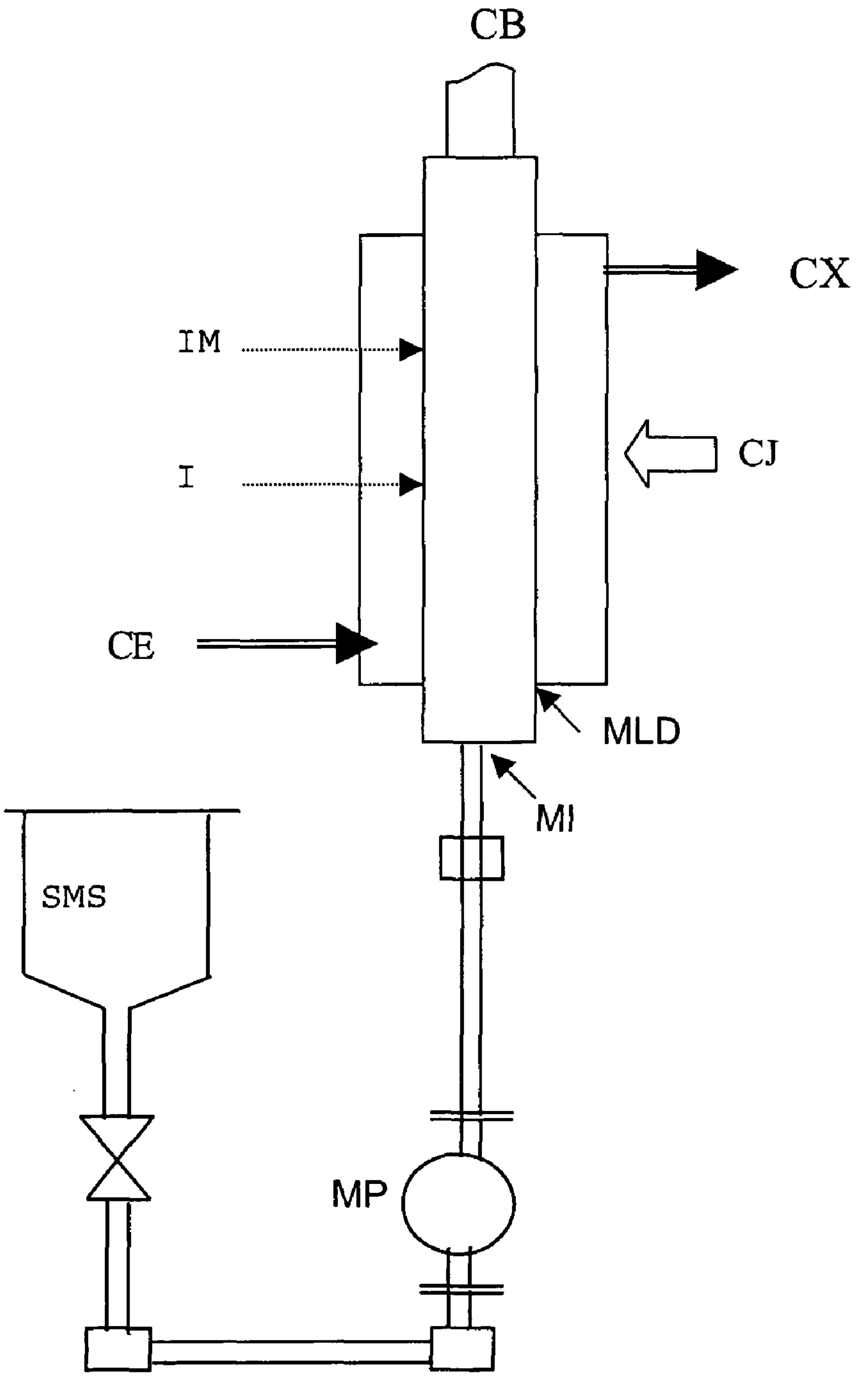

PROCESS TO PREPARE A SHAPED SOLID DETERGENT

The present invention relates to a system and a process for continuous casting of melt cast compositions such as soaps, detergent tablets and the like, and in particular to a system and method for continuous casting of such melt cast compositions involving solidification and shaping of the melt composition during traverse of the melt through a mould. This would favour continuous and effective mould filling and release, and also flexibility in generating a wide range of such cast products.

Soap or non-soap detergent based shaped articles are conventionally known to be produced by way of extrusion or by casting routes.

The extrusion process usually involve a plodder or extruder to take care of the shaping of the article, and by continuous extrusion of the soap/non-soap detergent through the extruder continuous production of logs or billets can be obtained, which can subsequently be stamped and shaped into tablets or bars.

As compared to the aforediscussed extrusion route which favours a continuous operation for production of soap or non-soap articles, the casting route is usually required for producing soaps with high formulation flexibility such as transparent soaps and those with high liquid content, which cannot be readily processed following the extrusion route.

U.S. Pat. No. 2,385,322 discloses a machine for solidifying and stacking a material that may be extruded and solidified comprising means to extrude the material, and means to receive and support the extruder material while it is solidified, means for feeding a rack into position to receive the solidified material, means to automatically feed a second rack into said position as the preceding rack is filled, means to sever the extruded stick, and means to feed a rack past the severing means, whereby the severed product may be placed on the rack. The system is basically a highly mechanized and complex mould filling, solidification and release system.

GB-A-597322 discloses an improved method of making soap bars or tablets by rapidly chilling molten 63% soap so as to solidify the soap within a few seconds, and thereafter without subjecting it to a drying operation plodding the solidifying soap, where one or more steps are taken to increase the degree to which the soap mass is compacted during plodding. Importantly, the above process teaches that the solidification of the molten soap is effected by rapid chilling in a matter of few seconds instead of by frame, slab or bar-cooling. Such rapid chilling produces soap which is firm and tough, and possesses adequate solidity and plasticity for satisfactory plodding and stamping.

EP-A-321179 discloses a method of casting soap or detergent wherein liquid or semi-iquid soap is filled into a pack made of flexible film, such that the soap material occupies the whole of the pack. The pack is then tightly sealed to extrude air, and the soap material is allowed to set in the pack to obtain cast-in-pack tablets. This process helps in producing a continuous string of packed soap sachets. The process refers to continuous methods of casting, requires sealing and pressurizing of individual sachets, and is supposed to significantly slow down the throughput rates. Moreover, the process essentially calls for the use of extendable or shrinkable polymers, to avoid formation of wrinkles on the cast tablets.

WO-A-03/0125110 describes yet another continuous process for casting of soaps and the like comprising the steps of (i) filling a continuous tube of flexible material with a melt of the castable compositions, wherein the tube acts as a sleeve to the composition, such that the desired cross section area of the filled sleeve is obtained i.e. independent of its perimeter, (ii) solidifying and simultaneously shaping the said melt by cooling the said sleeve in or on a suitable mould. The process produces cast-in-sleeves logs that can be cut into billets/tablets, and optionally flow rapped.

It would be apparent from the above that such casting processes presently available can be categorized under batch or at best a semi-continuous operation, since cooling of the filled pack is proposed as a separate unit operation. Further, separate shaping of the filled pack is required, which is again complex and adds to the production time. Thus, whilst such casting routes presently available in the art do provide for greater flexibility in formulation with high levels of water and/or benefit agent contents, due to it's batch or at best semi-continuous mode of operation it is found to be labour and capital intensive as compared to the extrusion process.

The use of mechanized mould-filling and release mechanism or flexible moulds where the material sets in the mould and is cut along with the mould material have also been developed, but in such processes also the separate stages of filling, setting and releasing/cutting to obtain the shaped bar is involved, which involve complexities in control and affect the productivity, and due to the requirement of sophisticated machinery and equipment involving high capital investment.

It is thus the basic object of the present invention to be able to provide for a simple and continuous system and process for casting of setting materials, including non-quick setting materials such soaps, detergent tablets, deodorants, confectionery and the like which would avoid the limitations of batch process, and/or the semi-continuous processes of casting presently available to the art.

Another object of the present invention is directed to be able to provide for a simple and cost-effective continuous casting system and process which would enable on-line continuous production of shaped products such as soaps, detergent tablets and the like without the need for separate unit operations for cooling and shaping of the product in the moulds, and would favour solidifying and shaping of the molten soap during a simple traverse of the soap through a selective cooling-cum-moulding unit.

Another object of the present invention is to be able to provide for a simple and effective system and method of continuous casting and shaping of e.g. soap and detergent products which would enable greater flexibility in controlling the characteristics of the product form, such as those required for obtaining special quality product like soaps with high solvent content such as transparent cast bar, and/or with advantageous benefit/aesthetic agent incorporation.

Yet further object of the present invention is to be able to provide for a system and a method for continuous casting and shaping of castable products such as soap, detergents and the like which would involve minimal labour, and would facilitate automated production of cast and shaped bars of wide variety.

Yet further object of the present invention is to be able to provide for a desired system and method of continuous casting for product such as soap/detergents and the like which apart from avoiding the limitations of conventional batch processes and/or in sleeve casting would favour achieving various shapes of bars by mere change of a mould unit in the system, thereby imparting greater flexibility and convenience of continuous casting of such products.

Another object of the present invention is directed to being able to provide for a system and method of continuous casting of soaps/detergents which would avoid wastage and need for recycling, and favour cost-effective continuous on-line production of shaped bars/articles.

Yet further object of the present invention is to be able to provide for a system and method for manufacturing cast products continuously which would enable selective incorporation of colour/benefit/aesthetic agents into the product formed at desired levels and/or at desired locations/dispersion without disturbing the continuous production. This would help avoid limitations in adding such benefit/aesthetic agents in the conventional casting process including batch or the semi-continuous processes presently available.

Thus according to one aspect of the present invention, there is provided a system for continuous casting of melt-cast products such as soaps, detergents and the like comprising:

i. a substantially vertically disposable mould unit to favour solidification/casting of the melt cast composition during an upstream motion through the mould unit;
ii. the mould unit being operatively connected at its lower end to a supply source of the melt-cast composition; and
iii. means for controlling the temperature of the melt in the mould unit to achieve the desired solidification and shaping during traverse of the melt from the bottom of the mould towards the top thereof which is adapted to eject the formed cast product.

The mould unit as above is further preferably adapted such that the same subsequent to the upstream solidification/casting of the melt in it's vertically disposed position can be gradually brought to a horizontal disposition to favour ejection of the solid/cast product in the horizontal dimension operatively connected to the downstream finishing means/unit.

Also, the system for continuous casting of melt-cast products can advantageously comprise a high-surface area heat exchanger provided ahead of the shaping mould to improve the efficiency of cooling and throughput.

In accordance with a preferred aspect of the present invention, the system for continuous casting of melt-cast products such as soaps, detergents and the like comprises:

a vertically disposed mould unit;

i. the mould unit operatively connected at it's lower end to a supply source for the melt-cast composition;
ii. means for controlling the temperature in the mould unit to achieve the desired cooling comprising a cooling jacket on the mould having means for continuous supply of coolant there through to facilitate on-line cooling to facilitate solidification and shaping of the melt composition during its traverse from the bottom of the mould to the top, to eject as the cast product.

To favour effective cooling, the system can be adapted to feed the coolant at the lower end of the cooling jacket and exit at the top.

In accordance with a further preferred aspect of the present invention, the means for controlling the temperature of the melt in the mould such as the cooling jacket is adapted to produce a selective temperature gradient/distinct temperature zones through which the soap melt is allowed to traverse in the mould. This facilitates selective temperature control of melt during its traverse in the mould to achieve solidification and shaping, based upon the constitution of the soap formulation.

Additionally, in order to facilitate the release of the formed product while exiting from the mould, in accordance with a further aspect there is provided a heating zone near the exit of the jacketed mould/caster to improve the slip of the bar and it's throughput.

Importantly, the vertical disposition of the jacketed mould/caster and the filling of the mould for the continuous casting from the bottom to exit cast/formed bars from the top provides for uniform and complete filling of the mould jacket and achieves consistent product form, free of problems of air pockets and/or any required re-circulation during startup. Moreover, the dead regions in the cooling jacket which are possible in the case of horizontal/inclined filling can also be avoided.

The operative connections of the mould in the system can be selectively provided to facilitate change over of the mould, depending upon the desired cross-section of the cast product. This whilst favouring the continuous production also takes care of limitations of batch processes, where the whole set of moulds are required to be changed, or the presently available continuous cast processes when the shaping rig and/or sleeve making unit have to be totally dismantled and changed.

In the above system, according to a further aspect the jacketed mould selectively includes means for selective injection of benefit/aesthetic agents in the soap formulation during the solidification/shaping process while it traverses the mould unit, which cannot be achieved in the case of any of known batch, as well as the conventional slip casting systems. Importantly, the possibility of varied temperature gradient in the jacketed mould and such provision for injection of benefit/aesthetic agents together facilitate providing even in case of continuous casting, injection of any secondary material into the main bar while keeping it segregated. The viscosity of the cast soap material would vary along the flow direction due to cooling, and therefore the injected material with a wide range of viscosity can be used by appropriately choosing the injection point or points.

Importantly, the above system of the present invention effectively provides for the first time by way of a continuous moulding system a mechanism which would favour solidification and shaping of the soap during it's traverse in the selective mould unit, advantageously utilizing the relative flow between the melt and mould surface. This clearly deviates from the conventional attempt to either mechanize mould filling and/or release mechanism, or using flexible moulds to allow setting of material in the mould to be cut off with the mould material.

In accordance with another aspect of the present invention, there is provided a method for continuous casting of melt-cast compositions such as soaps, detergents and the like comprising:

supplying a molten melt-cast composition through a vertically disposed mould unit having temperature control means from the bottom, and allowing the melt to traverse upwards in the mould; and controlling the mould temperature to thereby favour solidification and shaping of the melt into cast product in the mould which ejects from the top of the mould unit.

In accordance with the preferred aspect of the present invention, in the above method for continuous casting of melt-cast products such as soaps, detergents and the like the mould unit temperature is controlled by regulating the means for controlling the temperature in the mould unit to achieve the desired casting. In particular such as in case of a jacketed mould having means for continuous supply of coolant there through, the coolant temperature and/or it's path can be regulated to facilitate on-line differential cooling to favour solidification and shaping based on the melt composition.

Advantageously, in the above process of the invention, the continuous production of cast bars is achieved by way of vertically upward and controlled filling of the soap melt in the jacketed mould. Such a method takes cares of problems of air pockets and non-uniform filling in case of horizontal/inclined filling. Importantly, the selective vertically upward filling achieves a uniform and complete filling of the casting section, as well as the jacket, and therefore leads to a consistent product.

As mentioned above, by way of the above method it is possible to selectively regulate the temperature in the cooling jacket to provide for a selective temperature gradient during the cooling of the melt to achieve the cast. The zone of the jacketed mould just adjacent the exit/outlet of the formed bars can be selectively heated by a heating mechanism to facilitate the non-stick and easy throughput of the bars.

As and when desired, the cross section of the mould can be selectively changed by simple change over of the releasably secured mould to obtain shaped bars of desired cross section through a continuous process. This provides for a simple mechanism for obtaining continuously shaped bars of varied cross section through a simple route, and with less involvement of labour.

The above method is simple, cost-effective (avoids wastages and recycling of wastes), and ensures production of shaped bars repeatedly and continuously, avoiding uneven bar and/or recycling of the product to provide uniformity in manufacture.

Thus the above method of on-line continuous generation of bars would facilitate on the one hand controlling the temperature gradient during the cooling of the melt during the casting process, thereby facilitating and maintaining desired forms and constitution of the product. Moreover, by way of a possible selective injection mechanism, benefit/aesthetic agents, for example colouring agents, e.g. slurry to provide stripes and/or benefit agents can be introduced during the casting process in the mould unit, which is never possible in case of batch processes, or in the case of the flexible sleeve casting presently available, as a continuous casting method.

Following the above process of the invention, in continuous casting a secondary material can be continuously injected into the main bar while keeping it segregated. The viscosity of the cast soap material will vary along the flow direction due to cooling, and therefore the injected material with a wide range of viscosity can be used by appropriately choosing the injection positioned during traverse of the cast formulation through the jacketed mould.

Using the above system and method of the invention different products that can be cast such as a soap, detergent, deodorant or confectioneries or the like, including non-quick setting materials, at high throughput rates. The process is particularly preferred for home and personal care compositions such as soap and detergent bars.

Any conventional melt-cast detergent composition is suitable for the process of the invention. This would allow much desired high formulation flexibility by way of a controlled continuous casting. The particularly preferred soap composition include saturated fatty acid soap, detergent actives and possibly up to 60% water, with or without other additives and benefit agents.

The detergent actives suitable include any non-soap detergent actives or the salts of unsaturated fatty acids. Non-soap detergent actives are suitably selected from anionic, nonionic, cationic, amphoteric or zwitterionic surfactants or their mixtures.

The benefit/aesthetic agents which can be incorporated/injected during the casting include liquid benefit agents/additives. Suitable liquid skin benefit agent materials include materials such as anti-ageing compounds, emollients, moisturizers, sunscreens, and any other known benefit agent. Solubilisers as suitable additives for use in the detergent composition include monohydric and polyhydric alcohols such as propylene glycol, sorbitol, glycerin etc.

The melt-cast formulation can also include other optional ingredients such as hair conditioning agents, fillers, colours, perfume, opacifier, preservatives, one or more water insoluble particulate materials such as talc, kaolin, polysaccharides and other conventional ingredients.

For the selective solidification and shaping, the mould temperature can be regulated based on the melt which can be of any suitable temperature, such as up to 120° C., preferably between 40° C. to 90° C.

BRIEF DESCRIPTION OF THE DRAWINGS

The details of invention, its objects and advantages are further explained hereunder in greater detail in relation to non-limiting accompanying FIGURE by way of example only, wherein:

FIG. 1 is a schematic illustration of the system for the continuous on-line production of soap/detergent bars in accordance with the present invention.

As shown in FIG. 1, the system for such continuous casting in accordance with the present invention basically involves a jacketed mould (MLD) which is covered by the cooling jacket (CJ). The cooling jacket, which surrounds the mould, is provided with cooling means such as the coolant entry (CE) at the bottom and the coolant exit (CX) at the top. The mould (MLD) as shown in the FIGURE is preferably and selectively vertically disposed to facilitate a vertically upward feed of the soap melt from the bottom of the mould for the continuous casting. To facilitate such feeding of the mould from the bottom for the casting process, the soap melt is metered into the mould (MLD) through the bottom by operative connection of the inlet (MI) of the mould to the soap melt source (SMS) through a metering pump (MP).

Advantageously, in accordance with the preferred aspect of the system of the invention, the moulding jacket is adapted to facilitate a desired temperature gradient for the soap melt during its traverse from the bottom of the mould and until it exits as the formed bar from the outlet. For the purpose, effective temperature control gadgets can be provided which can facilitate attaining such a temperature gradient, depending upon the soap formulation to be formed.

The system can also include injection means (IM) selectively disposed in relation to the mould to favour selective injection of colouring/benefit/aesthetic agents in the soap during it's traverse through the mould unit. Importantly, the selective provision of temperature gradient and the disposition of the injection means would favour flexibility in obtaining on-line continuous production of shaped bars with varied constitution, structure, characteristic and appearance.

The method of on-line production of such shaped bars involving the above system is simple and continuous. To carry out the method, the soap melt through the metering pump is continuously fed from the bottom of the mould unit. Thereafter, the soap melt is forced through the mould unit (MLD) and in the process the same is selectively cooled to the desired extent, and at desired stages during it's traverse through the mould to facilitate solidification and shaping, maintaining the desired constitution and character of the formed bar. Advantageously, as indicated above, depending upon the soap composition and the characteristics/appearance desired, various coloring/benefit/aesthetic agents could be introduced by injection into the soap during its motion in the mould.

Finally, the formed bars exit as cast bars (CB) from the top of the mould.

Importantly, the above system and method of the invention advantageously provides for a continuous casting for soap/detergent bars and the like, wherein the casting of the formulation i.e. the solidification and shaping is achieved during the traverse of the formulation in a stationery mould. This makes for advantageous use of system of continuous moulding where there is a relative flow between the liquid and the mould material. Importantly, the vertical filling followed in the above system/method provides for uniform and complete filling of the casting section, avoiding any dead regions and/or air pockets, and also any need for recirculation during start up required for downward filling.

Moreover, the temperature gradient in the cooling jacket and the possibility of injection of colour/benefit/aesthetic agents during the moulding which are not possible following either batch process or the continuous sleeve casting can be attained by way of the above invention, which would impart the much required flexibility in manufacture, as well as obtaining a wide variety of formulations through the continuous cast route, apart from ensuring the desired throughput of a continuous process of casting.

The invention claimed is:

1. A method for continuous casting of shaped fatty acid soap melt-cast compositions comprising:

supplying a molten melt-cast fatty acid soap composition through a vertically disposable mould unit having temperature control means upstream from bottom, and allowing the melt to traverse upwards in the mould in a continuous casting process;

controlling the mould temperature to thereby favour selective solidification and shaping of the melt into cast fatty acid soap product in the mould, which finally ejects from the top of the mould unit; and wherein the fatty acid and soap melt-cast composition cannot be readily stamped and shaped into tablets or bars following extrusion.

2. A method for continuous casting of shaped fatty acid soap melt-cast compositions as claimed in claim 1 wherein a high-surface area heat exchanger provided ahead of the shaping mould is operated to improve the efficiency of cooling and throughput.

3. A method as claimed in claim 1 wherein the mould unit temperature is controlled by regulating the means for controlling the temperature in the mould unit to achieve the desired casting based on the melt-composition.

4. A method as claimed in claim 1 wherein the temperature of the mould is controlled by regulating the coolant temperature and/or it's path to facilitate on-line differential cooling to achieve selective solidification and shaping based on the melt composition.

5. A method as claimed in claim 1 comprising continuous production of cast shaped fatty acid soap bars by way of vertically upward and controlled filling of the soap melt in the jacketed mould.

6. A method as claimed in claim 1 wherein the zone of the jacketed mould just adjacent the exit/outlet of the formed bars is selectively heated by a heating means to facilitate the non-stick and easy throughput of the bars.

7. A method as claimed in claim 1 wherein the cross section of the mould is selectively changed by simple change over of the releasably secured mould to obtain shaped bars of desired cross section thorough a continuous process.

8. A method as claimed in claim 1 wherein the viscosity of the melt-cast is varied selectively during its motion in the mould to obtain desired product form/appearance.

9. A method as claimed in claim 1 wherein benefit/colour/aesthetic agents are injected into the composition during its formation during traverse in the mould.

10. A method as claimed in claim 1 wherein the soap composition used further comprises non-soap detergent actives, optionally having up to 60% water, and optionally having other additives and benefit agents.

11. A method as claimed in claim 1 wherein for the selective solidification and shaping the mould temperature is regulated based on the melt of any suitable temperature.

* * * * *